US009026047B2

(12) United States Patent  
Royston

(10) Patent No.: US 9,026,047 B2  
(45) Date of Patent: May 5, 2015

(54) SYSTEMS AND METHODS FOR PROVIDING NFC SECURE APPLICATION SUPPORT IN BATTERY-OFF MODE WHEN NO NONVOLATILE MEMORY WRITE ACCESS IS AVAILABLE

(75) Inventor: Philip Stewart Royston, Newbury (GB)

(73) Assignee: Broadcom Corporation, Irvine, CA (US)

( * ) Notice: Subject to any disclaimer, the term of this patent is extended or adjusted under 35 U.S.C. 154(b) by 668 days.

(21) Appl. No.: 13/172,204

(22) Filed: Jun. 29, 2011

(65) Prior Publication Data  
US 2013/0005245 A1 Jan. 3, 2013

(51) Int. Cl.  
H04B 5/00 (2006.01)  
H02J 5/00 (2006.01)

(52) U.S. Cl.  
CPC .............. H04B 5/0037 (2013.01); H02J 5/005 (2013.01)

(58) Field of Classification Search  
USPC ................................................ 455/41.1–41.2  
See application file for complete search history.

(56) References Cited

U.S. PATENT DOCUMENTS

| 7,177,594 | B2* | 2/2007 | Burr .............................. 455/41.2 |
| 2004/0243680 | A1* | 12/2004 | Mayer ........................... 709/206 |
| 2006/0138245 | A1 | 6/2006 | Lee |
| 2007/0198981 | A1* | 8/2007 | Jacobs et al. .................. 718/102 |
| 2008/0037487 | A1* | 2/2008 | Li et al. ......................... 370/338 |
| 2008/0150698 | A1* | 6/2008 | Smith et al. ................... 340/10.4 |
| 2008/0155258 | A1* | 6/2008 | Obereiner et al. ............ 713/168 |
| 2009/0206666 | A1 | 8/2009 | Sella et al. |
| 2009/0291634 | A1* | 11/2009 | Saarisalo ...................... 455/41.1 |
| 2010/0029202 | A1* | 2/2010 | Jolivet et al. ................. 455/41.1 |
| 2010/0205472 | A1 | 8/2010 | Tupman et al. |
| 2010/0227553 | A1 | 9/2010 | Charrat et al. |
| 2010/0248710 | A1* | 9/2010 | Sklovsky et al. ............. 455/420 |
| 2011/0181399 | A1* | 7/2011 | Pollack et al. .............. 340/10.33 |
| 2012/0309302 | A1* | 12/2012 | Buhot .......................... 455/41.1 |
| 2013/0176115 | A1* | 7/2013 | Puleston et al. ........... 340/10.51 |

FOREIGN PATENT DOCUMENTS

| CN | 101159027 A | 4/2008 |
| CN | 101345793 A | 1/2009 |

(Continued)

OTHER PUBLICATIONS

International Standard: ISO/IEC 21481, *Information technology—Telecommunications and information exchange between systems—Near Field Communication Interface and Protocol-2(NFCIP-2)*, pp. 1-11, First edition, Reference number ISO/IEC 21481:2005(E), ISO/IEC (Jan. 2005).

(Continued)

*Primary Examiner* — Ganiyu A Hanidu  
(74) *Attorney, Agent, or Firm* — Sterne, Kessler, Goldstein & Fox PLLC

(57) ABSTRACT

Embodiments of the present invention provide systems and methods for NFC secure application support when an NFC device is executing in a battery-off or battery-low mode. In such a case, the NFC device may have enough power to execute some applications (e.g., read-only applications) but not enough power to execute others (e.g., applications that require data to be written). Embodiments of the present invention enable these lower-power applications to be executed by the NFC device even when a host communications device has no battery power.

20 Claims, 7 Drawing Sheets

(56) References Cited

FOREIGN PATENT DOCUMENTS

| CN | 101790183 A | 7/2010 |
|---|---|---|
| WO | WO 2007/126375 A1 | 11/2007 |

OTHER PUBLICATIONS

International Standard: ISO/IEC 18092, *Information technology—Telecommunications and information exchange between systems—Near Field Communication—Interface and Protocol (NFCIP-1)*, pp. 1-64, First edition, Reference number ISO/IEC 18092:2004(E), ISO/IEC (April 2004).

International Standard: ISO/IEC 7816-4, *Identification cards—Integrated circuit cards—Part 4: Organization, security and commands for interchange*, pp. 1-90, Second edition, Reference number ISO/IEC 7816-4:2005(E), ISO/IEC (Jan. 2005).

International Standard: ISO/IEC 14443-4, *Identification cards—Contactless integrated circuit(s) cards—Proximity cards—Part 4: Transmission protocol*, pp. 1-44, First edition, Reference number ISO/IEC 14443-4:2001(E), ISO/IEC (Feb. 2001).

Office Action directed to related Chinese Patent Application No. 201210227050.4, mailed Jun. 30, 2014; 7 pages.

English-language abstract of Chinese Patent Application Publication No. 101159027 A; 1 page.

English-language abstract of Chinese Patent Application Publication No. 101345793 A; 1 page.

English-language abstract of Chinese Patent Application Publication No. 101790183 A; 1 page.

Office Action for Taiwanese Patent Application No. 10320601390, mailed on May 7, 2014.

* cited by examiner

| AID | Instructions |
|---|---|
| A000000000001 | CMD1 |
| A000000000002 | CMD2 |
| A000000000003 | CMD3 |

FIG. 4A

| AID | Instructions | Battery-off |
|---|---|---|
| A000000000001 | CMD1 | 0 |
| A000000000002 | CMD2 | 1 |
| A000000000003 | CMD3 | 0 |

FIG. 4B

| AID | Instructions | Power | Location |
|---|---|---|---|
| A000000000001 | CMD1 | 10 | DEV1 |
| A000000000002 | CMD2 | 11 | DEV2 |
| A000000000003 | CMD3 | 01 | DEV0 |

FIG. 4C

SYSTEMS AND METHODS FOR PROVIDING NFC SECURE APPLICATION SUPPORT IN BATTERY-OFF MODE WHEN NO NONVOLATILE MEMORY WRITE ACCESS IS AVAILABLE

FIELD OF THE INVENTION

The invention relates to near field communications (NFC) and more specifically to providing NFC application support in a battery-off mode.

BACKGROUND OF THE INVENTION

Near field communication (NFC) devices are being integrated into communication devices, such as mobile devices, to facilitate the use of these communication devices in conducting daily transactions. For example, instead of carrying numerous credit cards, a NFC device user can use an NFC device to store credit information provided by credit cards. To provide access to this credit information, the NFC device user taps the NFC device to a credit card terminal to relay the credit information to the terminal. Another example of an NFC device application is a ticket writing system, such as those used in bus and train terminals. Ticket fare information may be written onto the NFC device instead of providing a ticket to a passenger. The passenger then taps the NFC device to a reader to ride the bus or the train without the use of a paper ticket.

Generally, NFC requires that NFC devices be present within a relatively small distance from one another so that their corresponding magnetic fields can exchange information. Typically, a first NFC device transmits or generates a magnetic field modulated with the information, such as the credit information or the ticket fare information. This magnetic field inductively couples the information onto a second NFC device that is proximate to the first NFC device. The second NFC device may respond to the first NFC device by inductively coupling its corresponding information onto the first NFC device.

Under certain circumstances, a NFC device may have to derive power from the magnetic field of another NFC device. Typically, the NFC device may support many applications, such as interfacing with a memory to access the credit information and/or the ticket fare information. Some of these applications, such as reading the credit information and/or the ticket fare information from the memory, require a relatively small amount of power and may be supported using this harvested energy. Whereas, other applications, such as writing the credit information and/or the ticket fare information to the memory, that require a relatively large amount of power may not be supported using this harvested energy. What is needed are systems and methods for determining which applications may be supported using the harvested energy.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings:

FIG. 4A is a chart illustrating an exemplary application identifier (AID) table.

FIG. 4B is a chart illustrating an exemplary application AID table incorporating a battery-off mode field in accordance with an embodiment of the present invention.

FIG. 4C is a chart illustrating an exemplary application AID table incorporating a power field and a location field in accordance with an embodiment of the present invention.

Figure 1:
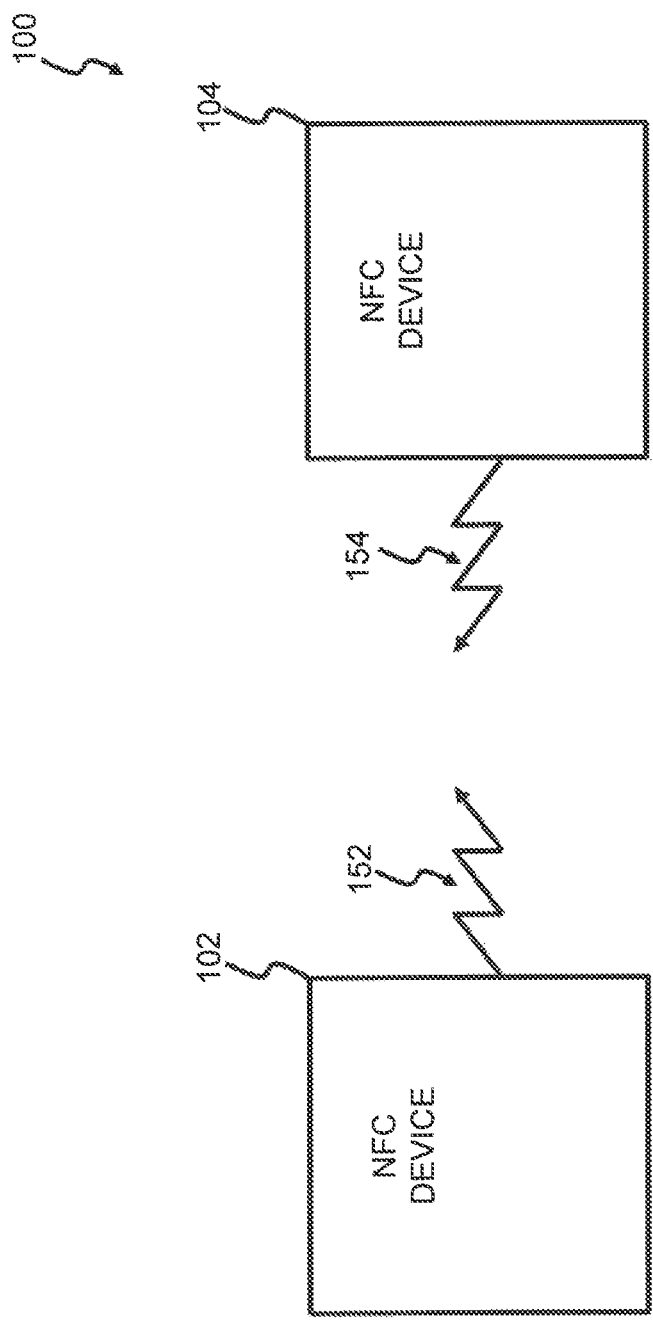
FIG. 1 illustrates a block diagram of a near field communication (NFC) environment according to an embodiment of the invention.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

In the following description, numerous specific details are set forth to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

1. Overview

Embodiments of the present invention provide systems and methods for near field communication (NFC) secure application support when an NFC device is executing in a battery-off or battery-low mode. In such a case, the NFC device may have enough power to execute some applications (e.g., read-only applications) but not enough power to execute others (e.g., write-only or read/write applications). Embodiments of the present invention enable these lower-power applications to be executed by the NFC device even when a host communications device has no battery power.

2. NFC Communications

2.1. NFC Communications Environment

FIG. 1 illustrates a block diagram of a NFC environment according to an embodiment of the invention. A NFC environment 100 enables wireless communication of information, such as one or more commands and/or data, between a first NFC device 102 and a second NFC device 104 that are sufficiently proximate to each other. NFC device 102 and/or NFC device 104 may be implemented as a standalone or discrete devices or may be incorporated within or coupled to another electrical device or host device, such as a mobile telephone, a portable computing device, another computing device, such as a personal computer, a laptop, a desktop computer, a computer peripheral, such as a printer, a portable audio and/or video player, a payment system, a ticketing writing system, such as a parking ticketing system, a bus ticketing system, a train ticketing system, an entrance ticketing system, a ticket reading system, a toy, a game, a poster, packaging, advertising material, a product inventory checking system, and/or any other suitable electronic device that will be apparent to those skilled in the relevant art(s) without departing from the spirit and scope of the invention. Herein, a NFC-capable device refers to an electrical device or host device that is integrated with a NFC device or the NFC device itself.

The first NFC device 102 and/or the second NFC device 104 interact with each other to exchange information, such as one or more commands and/or data, in a peer (P2P) communication mode or a reader/writer (R/W) communication mode. In the P2P communication mode, the first NFC device 102 and the second NFC device 104 may be configured to operate according to an active communication mode and/or a passive communication mode. The first NFC device 102 modulates its corresponding information onto a first carrier wave, referred to as a modulated information communication, and generates a first magnetic field by applying the modulated information communication to the first antenna to provide a first information communication 152. The first NFC device 102 ceases to generate the first magnetic field after transferring its corresponding information to the second NFC device 104 in the active communication mode. Alternatively, in the passive communication mode, the first NFC device 102 continues to apply the first carrier wave without its corresponding information, referred to as an unmodulated information communication, to continue to provide the first information communication 152 once the information has been transferred to the second NFC device 104.

The first NFC device 102 is sufficiently proximate to the second NFC device 104 such that the first information communication 152 is inductively coupled onto a second antenna of the second NFC device 104. The second NFC device 104 demodulates the first information communication 152 to recover the information. The second NFC device 104 may respond to the information by modulating its corresponding information onto a second carrier wave and generating a second magnetic field by applying this modulated information communication to the second antenna to provide a second modulated information communication 154 in the active communication mode. Alternatively, the second NFC device 104 may respond to the information by modulating the second antenna with its corresponding information to modulate the first carrier wave to provide the second modulated information communication 154 in the passive communication mode.

In the R/W communication mode, the first NFC device 102 is configured to operate in an initiator, or reader, mode of operation, and the second NFC device 104 is configured to operate in a target, or tag, mode of operation. However, this example is not limiting, and those skilled in the relevant art(s) will recognize that the first NFC device 102 may be configured to operate in the tag mode, and the second NFC device 104 may be configured to operate as in the reader mode in accordance with the teachings herein without departing from the spirit and scope of the present invention. The first NFC device 102 modulates its corresponding information onto the first carrier wave and generates the first magnetic field by applying the modulated information communication to the first antenna to provide the first information communication 152. The first NFC device 102 continues to apply the first carrier wave without its corresponding information to continue to provide the first information communication 152 once the information has been transferred to the second NFC device 104. The first NFC device 102 is sufficiently proximate to the second NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 may respond to the information by modulating the second antenna with its corresponding information to modulate the first carrier wave to provide the second modulated information communication.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

2.2 NFC Devices

Figure 2:
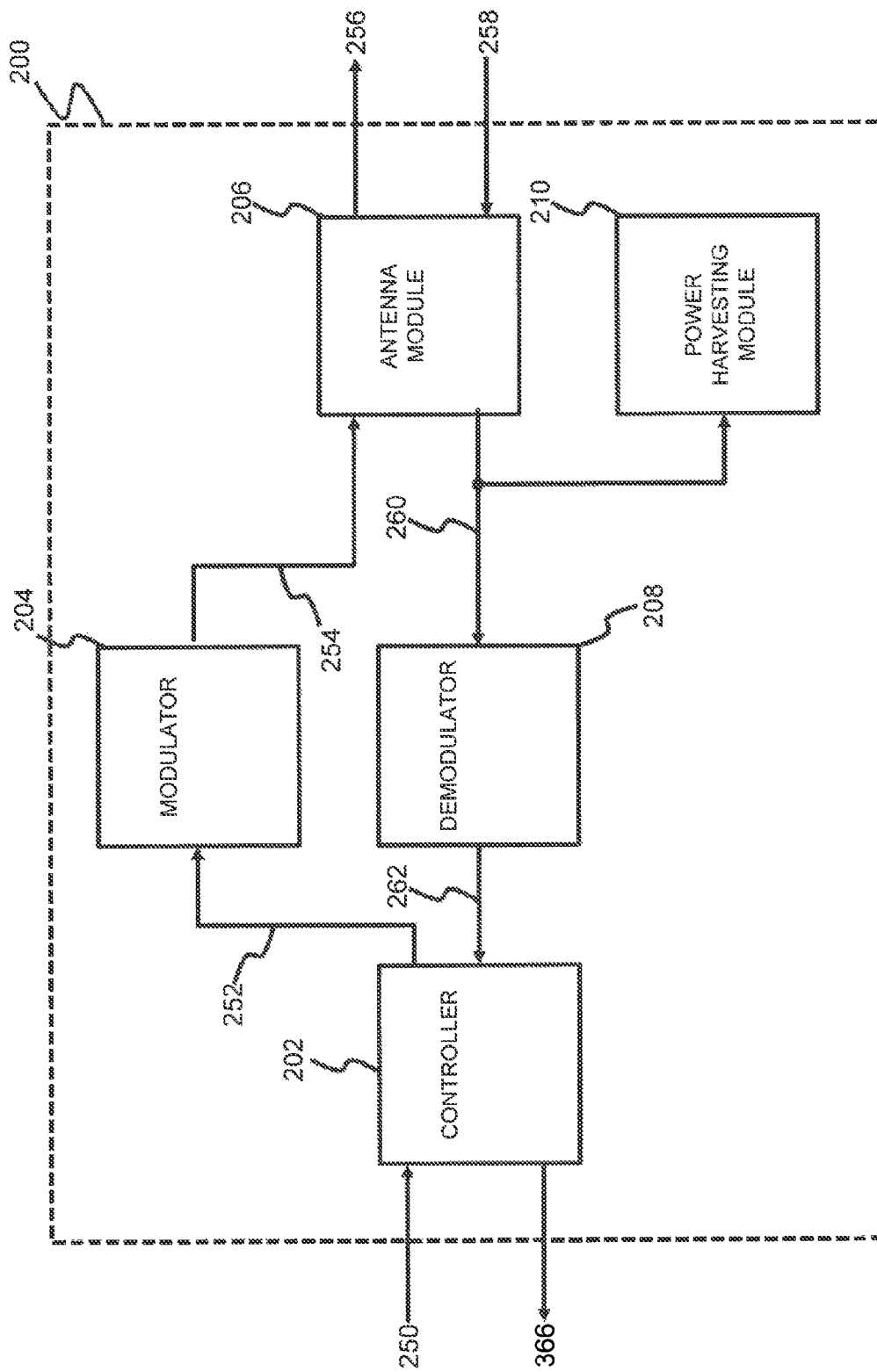
FIG. 2 illustrates a block diagram of an NFC device that is implemented as part of the NFC environment according to an embodiment of the invention.

FIG. 2 illustrates a block diagram of an NFC device that is implemented as part of the NFC environment according to an exemplary embodiment of the invention. A NFC device 200 (e.g., NFC device 102 or 104) is configured to operate in a reader mode of operation to initiate an exchange of information, such as data and/or one or more commands to provide some examples, with other NFC devices or is configured to operate in a target, or tag, mode of operation to respond to a request to exchange the information with another NFC capable device. The NFC device 200 may be configured as a reader that only operates in the reader mode of operation, a tag that only operates in the tag mode of operation, or a communicator that operates in both the reader mode of operation and the tag mode of operation. The NFC device 200 includes a controller module 202, a modulator module 204, an antenna module 206, a demodulator module 208, and an optional power harvesting module 210. The NFC device 200 may represent an exemplary embodiment of the first NFC device 102 and/or the second NFC device 104.

The controller module 202 controls overall operation and/or configuration of the NFC device 200. The controller module 202 receives information 250 from one or more data storage devices such as one or more contactless transponders, one or more contactless tags, one or more contactless smartcards, any other machine-readable mediums that will be apparent to those skilled in the relevant art(s) without departing from the spirit and scope of the invention, or any combination thereof. The other machine-readable mediums may include, but are not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples. The controller module 202 may also receive the information 250 from a user interface such as a touch-screen display, an alphanumeric keypad, a microphone, a mouse, a speaker, any other suitable user interface that will be apparent to those skilled in the relevant art(s) without departing from the spirit and scope of the invention. The controller module 202 may further receive the information 250 from other electrical devices or host devices coupled to the NFC device 200.

Typically, the controller module provides the information 250 as transmission information 252 for transmission to another NFC capable device. However, the controller module 202 may also use the information 250 to control the overall operation and/or configuration of the NFC device 200. For example, the controller module 202 may issue and/or execute the one or more commands in accordance with the data, if appropriate, to control operations of the NFC device 200, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the invention, of other NFC capable devices.

Additionally, the controller module 202 may format the information 250 into information frames and may perform error encoding, such as cyclic redundancy check (CRC) to provide an example, on the information frames to provide the transmission information 252. The information frames may include frame delimiters to indicate a start and/or an end of each of the information frames. The controller module 202 may additionally arrange multiple information frames to form sequences of information frames to synchronize and/or to calibrate the NFC device 200 and/or another NFC capable device. The sequences may include sequence delimiters to indicate a start and/or an end of each of the sequences.

Further, the controller module 202 may perform other functionality as described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

The modulator module 204 modulates the transmission information 252 onto a carrier wave, such as a radio frequency carrier wave having a frequency of approximately 13.56 MHz to provide an example, using any suitable analog or digital modulation technique to provide a modulated information communication as transmission information 254. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The modulator module 204 may continue to provide the carrier wave to provide an unmodulated information communication as the transmission information 254 once the transmission information 252 has been transferred to another NFC capable device. Alternatively, the modulator module 204 may cease to provide the transmission information 254 once the transmission information 252 has been transferred to another NFC capable device.

The antenna module 206 applies the transmission information 254 to an inductive coupling element, such as a resonant tuned circuit, to generate a magnetic field to provide a transmitted information communication 256. Additionally, another NFC-capable device may inductively couple a received communication signal 258 onto the inductive coupling element to provide a recovered communication signal 260. For example, this other NFC-capable device may respond to the information by modulating its corresponding antenna with its corresponding information to modulate the carrier wave to provide the received communication signal 258. As another example, this other NFC-capable device may modulate its corresponding information onto its corresponding carrier wave and generate its corresponding magnetic field by applying this modulated information communication to its corresponding antenna to provide the received communication signal 258.

The power harvesting module 210 harvests power from a received communications signal. Typically, the power harvesting module 210 is implemented when the NFC device 200 is configured as the reader or the communicator. In an embodiment, the harvested power includes sufficient power to adequately operate controller 202, modulator 204, antenna module 206, and/or the demodulator 208. Additionally, the power harvesting module may provide sufficient power to operate one or more of the other components of a host communications device. According to some embodiments of the present invention, the power harvester module may also provide sufficient power to charge a battery coupled to the NFC device and/or a host communications device.

The demodulator module 208 demodulates the recovered communication signal 260 using any suitable analog or digital modulation technique to provide reception information 262. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

Typically, the controller mode provides the reception information 262 as recovered information 266 to the data store, the user interface, and/or other electrical devices or host devices. However, the controller module 202 may also use the reception information 262 to control the overall operation and/or configuration of the NFC device 200. The reception information 262 may include one or more commands and/or data. The controller module 202 may issue and/or execute the one or more commands to control the overall operation and/or configuration of the NFC device 200. For example, the controller module 202 may issue and/or execute the one or more commands in accordance with the data, if appropriate, to control operations of the NFC device 200, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the invention, of other NFC-capable devices.

Additionally, the controller module 202 formats the reception information 262 into a suitable format for transmission to the data store, the user interface, and/or other electrical devices or host devices, and may perform error decoding, such as cyclic redundancy check (CRC) decoding to provide an example, on the reception information 262 to provide recovered information 266.

2.3 NFC Device Integration into Host Device

Figure 3A:
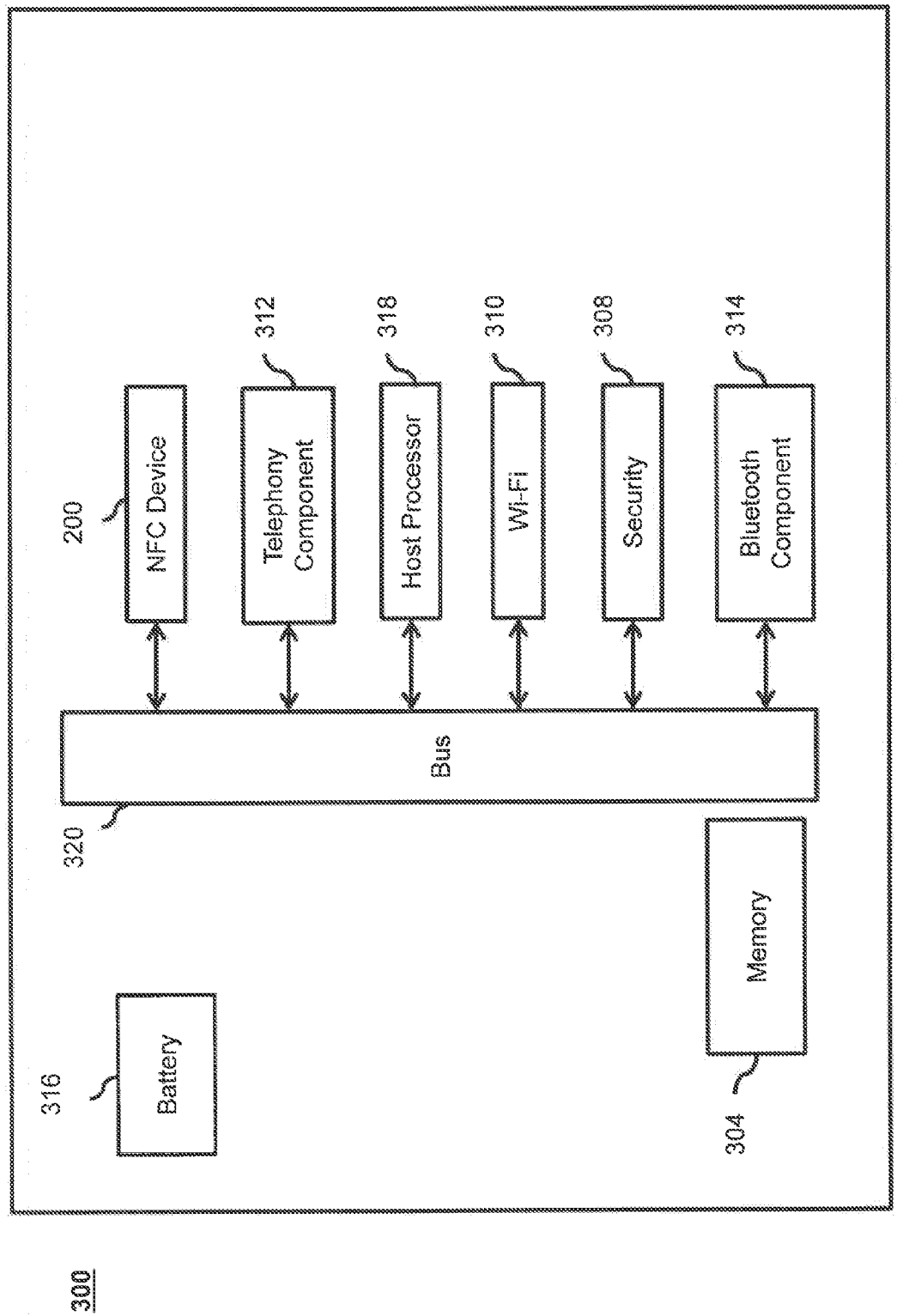
FIG. 3A illustrates a block diagram of a NFC device integrated into a communications device.

NFC devices (such as NFC device 200) may be integrated into a host communications device (e.g., a host mobile phone). FIG. 3A shows a block diagram illustration integration of NFC device 200 into electronic host communications device 300 with a shared memory 304 according to embodiments of the present invention. In an embodiment, the electronic communications device 300 includes the NFC device 200, the memory 304, a security component 308, a WI-FI component 310, a telephony component 312, a Bluetooth component 314, a battery 316 used to power the communications device, a host processor 318, and a bus 320. It should be understood that components 312, 318, 310, 308, and 314 are optional and are provided to illustrate components that may be incorporated into a host communications device. It should further be understood that, according to embodiments of the present invention, one, several, all, or none of components 312, 318, 310, 308, and 314 may be incorporated into the host communications device 300.

According to embodiments of the present invention, host communications device 300 may represent a number of electronic communications devices including, but not limited to, mobile telephones, portable computing devices, other computing devices such as personal computers, laptops, desktop computers, computer peripherals such as printers, portable audio and/or video players, payment systems, ticket writing systems such as parking ticket systems, bus ticketing systems, train ticketing systems, or entrance ticketing systems.

3. Systems for Providing NFC Secure Application Support in Battery-Off Mode

In an embodiment, NFC devices (e.g., NFC devices 102, 104, and/or 200) and/or NFC controllers (e.g., NFC controller 202) are designed to include secure element(s) that use a secure external memory. In an embodiment, this secure external memory is provided by a host mobile device (e.g., memory 304). In another embodiment, this secure external memory is provided by a dedicated additional non-volatile memory chip, such as flash or EE memory. Utilizing this external memory enables the NFC device and/or NFC controller to be manufactured using 40 nm process technology, which does not necessarily support non-volatile memory.

Using an external memory has some disadvantages, however. For example, when a host device (e.g., electronic communications device 300) is operating in a battery-off mode (or a low battery mode), NFC device 200 may not be able to harvest (e.g., using power harvesting module 210) enough energy to power the host device as well as the NFC device circuitry. This is especially true if the NFC device uses a small antenna (e.g., antenna module 206).

Figure 3B:
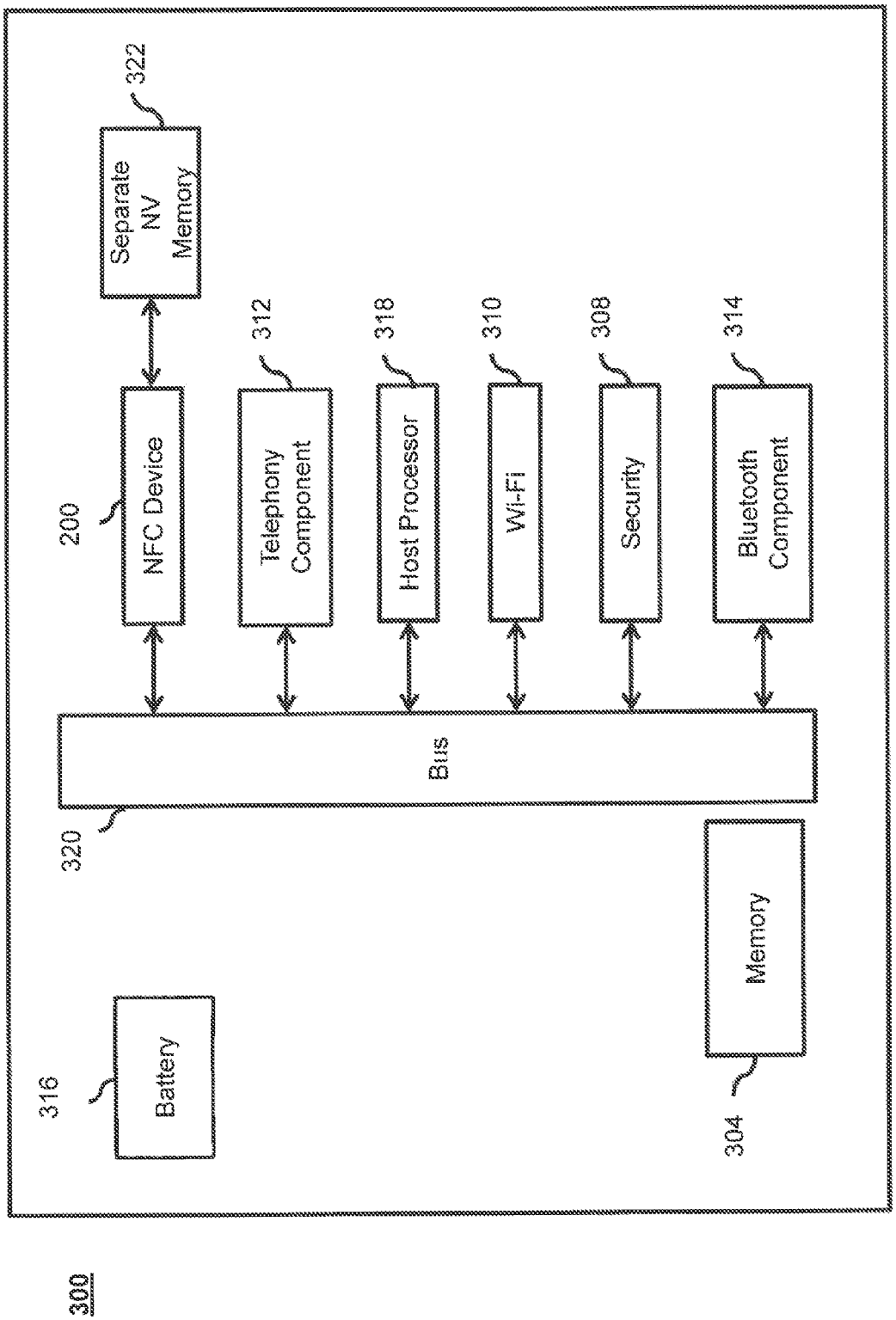
FIG. 3B illustrates a block diagram of a NFC device integrated into a communications device incorporating a separate nonvolatile memory.

One solution to this problem is to use a separate nonvolatile memory that is not shared by the host device. FIG. 3B shows the integration of this separate nonvolatile (NV) memory 322. As previously discussed, separate NV memory 322 may be flash or EE memory, and, in an embodiment, separate NV memory 322 is a secure memory. For example, data stored in separate NV memory 322 is encrypted for protection while in a non-secure device (e.g., host communications device 300). NFC device 200 can thus harvest energy using power harvesting module 210 and access memory from separate NV memory 322 without having to power-up all the other components of host communications device 300. It should be understood that while one separate NV memory 322 is shown in FIG. 3B, embodiments of the present invention incorporate multiple separate NV memories.

However, many NFC device applications require relatively high write currents, which in many cases prevents secure data being changed (i.e., written to) in battery-off mode. Thus, in some embodiments, NFC device 200 cannot harvest enough energy to support these high write currents even if separate NV memory 322 is used rather than host memory 304.

Some NFC device applications do not require writing of data. For example, access control cards contain information that is read from an NFC device rather than written to an NFC device. Thus, access control card functionality can be supported by an NFC device in battery-off mode or a battery-low mode, because the NFC device sending the access control card information does not have to harvest adequate energy to support higher write currents. Further, in some cases, the encryption of a secure memory block may be protected by an OTP (one time programmable) memory within a secure controller (used to count each change of the secure memory), and this type of memory can also require larger amounts of energy to program if an associated NV memory needs to be modified.

Embodiments of the present invention provide systems and methods for controlling secure applications in an NFC device to enable NFC device applications in battery-off mode (or a battery-low mode), which do not require a secure memory (e.g., separate NV memory 322) to be written as part of their operation. Embodiments of the present invention further prevent operation of secure applications requiring secure memory writing in battery-off or battery-low mode.

NFC devices communicate using command-response pairs. Applications may be selected implicitly or explicitly. In either case, a command to access an application contains an application identifier (AM). Thus, in an embodiment, a NFC device operating in battery-off or battery-low mode that receives a command to execute an application first determines (e.g., using controller 202) whether an application requires that data be written before determining whether the application should be enabled and/or executed.

In an embodiment, each NFC device contains a list of supported applications and optional related data elements (e.g., an AID table). This AID table may be stored, for example, in an OTP memory, an Electrically Erasable Programmable Read-Only Memory (EEPROM), or a flash memory of the NFC device. The list of AIDs in the AID table can be transmitted to a reader when the reader requests it. The reader may then issue a command to execute an application corresponding to one of the transmitted AIDs.

For example, this list of applications may be stored in a directory file, such as "EF.DIR," as described in International Standard ISO/IEC 7816-4, "Identification cards—Integrated circuit cards—Part 4: Organization, security and commands for interchange," published on Jan. 15, 2005, which is incorporated by reference herein in its entirety. The EF.DIR directory file contains a set of application identifiers and determines which commands shall be performed to select the applications. However, it should be understood that embodiments of the present invention are applicable to any table containing a list of applications and/or application identifiers.

In an embodiment, once the host communications device powers up, the communications device polls all secure elements (e.g., secure devices and/or secure memories) and updates an AID routing table with information regarding the write-only status of any particular application. In this embodiment, the write-only status of an application is either (1) known by the host communications device; (2) available from the secure element storing the application; (3) looked up from a web-based lookup table associated with the application; or (4) unknown. If the write-only status of an application is unknown, a user can be manually asked to determine whether the application is write-only.

FIG. 4A shows a table illustrating an exemplary AID table containing a list of AIDS 402 and (optionally) corresponding instructions 404 for executing the AIDs 402. FIG. 4B shows a "Battery-off Flag" column added to the table of FIG. 4A. It should be understood that the AIDs and instructions shown in FIGS. 4A and 4B are examples and serve to illustrate embodiments of the present invention. In accordance with an embodiment of the present invention, if an NFC device is executing in battery-off mode, the NFC device checks the corresponding battery-off flag 406 for an AID 402 referenced in a command prior to executing the instructions 404. In an embodiment, battery-off flag 406 indicates that an application should be enabled during battery-off or battery-low mode. In another embodiment, battery-off flag 406 indicates that an application should be disabled during battery-off or battery-low mode.

In an embodiment of the present invention, AIDs that have a battery-off flag set to "0" are not transmitted to a reader when the reader requests a list of available applications. Thus, in this embodiment, when a NFC device that is operating in the tag mode of operation is operating in battery-off mode, the reader cannot request that applications with higher power requirements (e.g., applications that require data to be written) be executed. In another embodiment, the full list of AIDs is transmitted to the reader along with the corresponding battery-off flag so that the reader is aware that some applications will not be executed upon request. In another embodiment, the full list of AIDs is transmitted to a reader without the battery-off flag, and the NFC device that is operating in the tag mode of operation ignores requests to execute applications that have a battery-off flag set to "0."

For example, application 408 has a battery-off flag set to "1." In an embodiment, this flag indicates that application 408 can be executed in battery-off mode because, for example, application 408 does not need to write to memory. Applications 409 and 410, on the other hand, have a battery-off flag set to "0," indicating that application 410 cannot be executed in battery-off mode (e.g., because application 410 needs to write to memory during execution). Thus, in an embodiment, during battery-off mode, only AID 408 is sent to a reader requesting a list of available applications.

In embodiments of the present invention, battery-off flag 406 is a multi-bit power code 411, as shown in FIG. 4C. For example, in embodiments of the present invention, the NFC device incorporates multiple power modes, and this power code 411 can be used to identify the minimum NFC device power mode required to support the application. For example, in some embodiments, the NFC device can harvest enough information to execute some applications but not enough power to execute others. In such a case, the NFC device determines whether the power code 411 indicates that the application requires more power than the power currently available in the power mode of the NFC device prior to executing the application.

In another embodiment, the NFC device can allocate a portion of its OTP memory for applications that do not require changes to memory. In such a case, the power required for battery operation can be even lower. In such a case, power code 411 can indicate that the corresponding application is resident in an OTP memory of an NFC device and requires an even smaller amount of power.

In other embodiments of the present invention, the power code 411 is a binary code indicating a minimum amount of power required by an application. In such a case, the NFC device determines whether the amount of power currently available to execute applications meets or exceeds the power indicated by power code 411. It should be understood that the "power" indicated by power code 411 in this embodiment may be any value in any unit of measurement required for application execution—(e.g., Watts, Volts, Amperes, Joules, etc.).

It should further be understood that an AID table in accordance with an embodiment of the present invention may incorporate additional features and/or columns. For example, another column may be added describing the location of an application (i.e., in which secure device and/or at what address in secure memory the application is stored. In such an instance, this column can instruct the NFC device which secure device should be powered up to run the corresponding application.

FIG. 4C shows a table illustrating another example in accordance with an embodiment of the present invention. Instead of using battery-off flags 406, the AID table of FIG. 4C incorporates power codes 411. In this example, the NFC device has 4 available power modes (e.g.: 00, indicating no power at all; 01 indicating enough power to run applications on its OTP memory; 10 indicating enough power to run applications on a separate NV memory; and 11 indicating enough power to run all applications).

When the NFC device receives a request for available applications, it checks to see what power mode it is currently executing in. For example, if the NFC device is executing in power mode 10, it sends only applications 409 and 410 to the reader. The NFC device may determine the current power mode by, for example, checking the level of battery 316 of host communications device 300 and checking the power generated by it its own power harvesting module 210.

Because application 409 is resident on the NFC device itself (as indicted by power mode 01), no other devices need to be powered up prior to execution of application 409. Application 410 is resident on device "DEV1." In an embodiment, the NFC device powers up DEV1 after it sends the AIDs to the reader. In another embodiment, NFC device waits for a request to execute application 410 prior to powering up DEV1.

4. Methods for Providing NFC Secure Application Support in Battery-Off Mode

Figure 5:
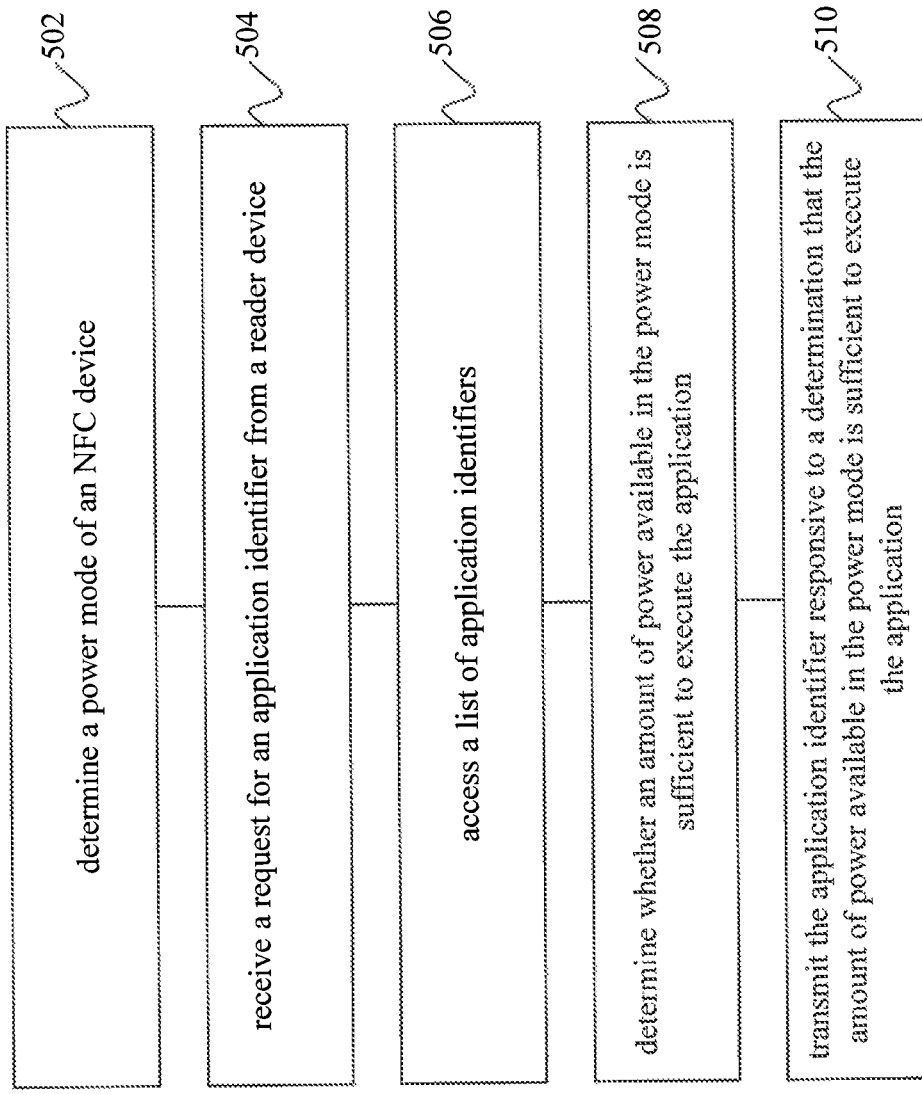
FIG. 5 is a flowchart illustrating a method of providing NFC secure application support in a battery-off mode in accordance with an embodiment of the present invention.

A method of providing NFC secure application support in a battery-off mode will now be explained with reference to the flowchart of FIG. 5. In step 502, a power mode of an NFC device (e.g., NFC device 200) is determined. For example, the NFC device can access a battery (e.g., battery 316) in a host communications device and/or a power harvesting module of the NFC device (e.g., power harvesting module 210) to determine how much power is available to the NFC device and what power mode corresponds to the available power.

In step 504, a request for an application identifier is received from a reader device. In step 506, the NFC device accesses a list of application identifiers. For example, in an embodiment, this list of application identifiers is an AID table (e.g., the AID table of FIGS. 4B and/or 4C).

In step 508, a determination is made regarding whether the NFC device has sufficient power to execute the application in the power mode. For example, the NFC device determines whether it is operating in battery-off or battery-low mode or, if multiple power modes are supported, if the power currently available to it is sufficient to support the application.

In step 510, the NFC device transmits the application identifier if it determines that it has enough power to execute the application. In an embodiment, the NFC device transmits a list of all applications that it has enough power to execute. Further, in an embodiment, the NFC device supplies power to secure devices storing supported applications prior to executing the applications.

5. Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A Near Field Communication (NFC) device, comprising:
   a power harvesting module;
   a memory configured to store a list of application identifiers; and
   a controller configured to:
      receive a request for a list of available application identifiers from a reader device,
      access the list of application identifiers,
      determine, by accessing information in the list of application identifiers, whether an amount of power available to the NFC device is sufficient for the NFC device to execute an application corresponding to an application identifier in the list of application identifiers, and
      transmit the list of available application identifiers, wherein the list of available application identifiers includes the application identifier responsive to a determination that the amount of power available to the NFC device is sufficient for the NFC device to execute the application, and wherein the list of available application identifiers does not include the application identifier responsive to a determination that the amount of power available to the NFC device is insufficient for the NFC device to execute the application.

2. The NFC device of claim 1, wherein the controller is further configured to determine whether a host communications device coupled to the NFC device has battery power below a predetermined amount of power.

3. The NFC device of claim 1, wherein the list of application identifiers contains a field indicating whether the application corresponding to the application identifier can be executed in a low power mode.

4. The NFC device of claim 1, wherein the controller is further configured to:
   determine a plurality of applications that the NFC device has sufficient power to execute, wherein the list of available application identifiers includes a plurality of application identifiers corresponding to the plurality of applications that the NFC device has sufficient power to execute.

5. The communications device of claim 1, wherein the controller is further configured to:
   receive a request from the reader device to execute an available application corresponding to one of the application identifiers in the list of available application identifiers; and
   supply power to a secure device configured to store the available application.

6. The NFC device of claim 1, further comprising a one-time programmable (OTP) memory, and wherein the controller is further configured to:
   determine whether the application corresponding to the application identifier is stored on the OTP memory.

7. A communications device, comprising:
   a battery; and
   a Near Field Communication (NFC) device, wherein the NFC device is configured to:
      check a power level of the battery to determine a power mode,
      receive a request for a list of available application identifiers from a reader device,
      determine, by accessing information in a list of application identifiers, whether an amount of power available in the power mode is sufficient for the NFC device to execute an application corresponding to an application identifier in the list of application identifiers, and
      transmit the list of available application identifiers, wherein the list of available application identifiers includes the application identifier responsive to a determination that the amount of power available in the power mode is sufficient for the NFC device to execute the application, and wherein the list of available application identifiers does not include the application identifier responsive to a determination that the amount of power available in the power mode is insufficient for the NFC device to execute the application.

8. The communications device of claim 7, wherein the list of application identifiers contains a field indicating whether the application corresponding to the application identifier can be executed in a low power mode.

9. The communications device of claim 7, further comprising an Electrically Erasable Programmable Read-Only Memory (EEPROM) of flash nonvolatile (NV) memory, and wherein the NFC device is further configured to determine whether the application corresponding to the application identifier is stored on the EEPROM.

10. The communications device of claim 7, further comprising a secure device configured to store the application corresponding to the application identifier.

11. The communications device of claim 10, wherein the communications device is configured to determine whether the NFC device has sufficient power to supply power to the secure device.

12. The communications device of claim 7,
   wherein the communications device is further configured to:
      determine a plurality of applications that the NFC device has sufficient power to execute, wherein the list of available application identifiers includes a plurality of application identifiers corresponding to the plurality of applications that the NFC device has sufficient power to execute.

13. The communications device of claim 12, wherein the NFC device is further configured to:
   receive a request from the reader device to execute an available application corresponding to one of the application identifiers in the list of available application identifiers; and
   supply power to a secure device in a plurality of secure devices that stores the available application.

14. The communications device of claim 7, wherein the communications device is further configured to support a plurality of power modes, and wherein a second power mode in the plurality of power modes indicates that the NFC device has sufficient power to execute applications stored in a one-time programmable (OTP) memory of the NFC device.

15. A method, comprising:
   determining a power mode of a Near Field Communication (NFC) device;
   receiving a request for a list of available application identifiers from a reader device;
   accessing a list of application identifiers;
   accessing a field corresponding to an application identifier in the list of application identifiers, wherein the field indicates whether an application corresponding to the application identifier can be executed in a lower power mode;
   determining, based on the field, whether an amount of power available in the power mode is sufficient to execute the application; and
   transmitting the list of available application identifiers, wherein the list of available application identifiers includes the application identifier responsive to a determination that the amount of power available in the power mode is sufficient to execute the application, and wherein the list of available application identifiers does not include the application identifier responsive to a determination that the amount of power available in the power mode is insufficient to execute the application.

16. The method of claim 15, further comprising:
   determining whether the application corresponding to the application identifier requires data to be written to memory.

17. The method of claim 15, wherein the power mode is a battery-off mode indicating that a host communications device has battery power below a predetermined amount of power.

18. The method of claim 15, wherein the field indicates a minimum amount of power required by the application for execution of the application.

19. The method of claim 15, wherein the power mode is one of a plurality of power modes, and wherein the field is a multi-bit field indicating the power mode.

20. A communications device, comprising:
   a battery; and
   a Near Field Communication (NFC) device, wherein the NFC device comprises:
      a power harvesting module;
      a memory configured to store a list of application identifiers; and
      a controller, wherein the controller is configured to:
         determine a power mode based on a power level of the battery,
         receive a request for a list of available application identifiers from a reader device,
         access the list of application identifiers,
         determine, based on the power mode and by accessing information in the list of application identifiers, a plurality of available applications that the NFC device has sufficient power to execute, wherein the list of available application identifiers includes a plurality of available application identifiers corresponding to the plurality of available applications,
         transmit the list of available application identifiers, wherein respective application identifiers in the list of available application identifiers correspond to the plurality of available applications.

* * * * *